United States Patent
Hur (10) Patent No.: US 11,033,818 B2
(45) Date of Patent: Jun. 15, 2021

(54) METHOD FOR PROVIDING CLOSE-RANGE BATTLE ROYALE GAME IN WHICH PERMITTED NUMBER OF PLAYERS AND PERMITTED AREA IN GAME MAP ARE DETERMINED DYNAMICALLY AND GAME SERVER USING THE SAME

(71) Applicant: Wonder People Co., Ltd., Seoul (KR)

(72) Inventor: Min Hur, Seoul (KR)

(73) Assignee: WONDER PEOPLE CO., LTD., Seoul (KR)

(*) Notice: Subject to any disclaimer, the term of this patent is extended or adjusted under 35 U.S.C. 154(b) by 0 days.

(21) Appl. No.: 17/097,517

(22) Filed: Nov. 13, 2020

(65) Prior Publication Data

US 2021/0146243 A1 May 20, 2021

(30) Foreign Application Priority Data

Nov. 14, 2019 (KR) .................. 10-2019-0146241

(51) Int. Cl.
*A63F 13/48* (2014.01)
*A63F 13/53* (2014.01)
(Continued)

(52) U.S. Cl.
CPC .............. *A63F 13/48* (2014.09); *A63F 13/35* (2014.09); *A63F 13/44* (2014.09); *A63F 13/53* (2014.09); *A63F 13/577* (2014.09); *A63F 13/795* (2014.09)

(58) Field of Classification Search
CPC .......... A63F 13/48; A63F 13/35; A63F 13/44; A63F 13/53; A63F 13/577; A63F 13/795
See application file for complete search history.

(56) References Cited

U.S. PATENT DOCUMENTS

| | | | |
|---|---|---|---|
| 2003/0211877 A1* | 11/2003 | Yamada | A63F 13/577 463/9 |
| 2004/0143852 A1 | 7/2004 | Meyers | |
| 2013/0296045 A1 | 11/2013 | Dun et al. | |

FOREIGN PATENT DOCUMENTS

WO 2019/164246 A1 8/2019

OTHER PUBLICATIONS

Player Unknown's Battlegrounds PC vs MOBILE—Gameplay (PUBG) URL: https://www.youtube.com/watch?v=vKBxcVWICnY Uploaded by Techzamazing Feb. 12, 2018 (Year: 2018).*

(Continued)

*Primary Examiner* — Tramar Harper
*Assistant Examiner* — Jeffrey K Wong
(74) *Attorney, Agent, or Firm* — Xsensus LLP (57) ABSTRACT

A method for providing a close-range battle royale game in which a permitted number of players and a permitted area in a game map are determined dynamically is provided. The method includes steps of: a game server (a) (i) determining a permitted number of the players by using a first algorithm, and (ii) determining specific users as specific players by referring to a specific counted number of the specific users during waiting time; (b) (i) selecting a set of coordinates for a base point in a permitted area by using a second algorithm, (ii) determining a size by referring to the permitted number, and (iii) determining the permitted area by referring to the set of the coordinates and the size; and (c) at least one of allowing the specific players to view the permitted area and determining starting positions of the specific players by referring to the permitted area.

18 Claims, 8 Drawing Sheets

(51) Int. Cl.
 *A63F 13/577* (2014.01)
 *A63F 13/44* (2014.01)
 *A63F 13/35* (2014.01)
 *A63F 13/795* (2014.01)

(56) References Cited

OTHER PUBLICATIONS

M-Game, "Event: Festival of Pathos", M-Game Event Notification from the Website M-Game—Exciting Internet Playground, Apr. 2, 2018, pp. 1-3 (7 pages including English Translation).
Naver Blog, "Chicken chicken for dinner! Mobile Battleground Released! Newborn beginner's guide", May 20, 2018, pp. 1-30 (42 pages including English Translation).
Extended European search report dated Mar. 22, 2021, in corresponding European patent Application No. 20200250.7, 14 pages.

* cited by examiner

METHOD FOR PROVIDING CLOSE-RANGE BATTLE ROYALE GAME IN WHICH PERMITTED NUMBER OF PLAYERS AND PERMITTED AREA IN GAME MAP ARE DETERMINED DYNAMICALLY AND GAME SERVER USING THE SAME

CROSS REFERENCE TO RELATED APPLICATION

The present application is based on and claims priority of Korean Patent Application No. 10-2019-0146241 filed on Nov. 14, 2019. The entire disclosure of the above-identified application, including the specification, drawings and claims is incorporated herein by reference in its entirety.

FIELD OF THE DISCLOSURE

The present disclosure relates to a method for providing a close-range battle royale game in which a permitted number of players and one of permitted areas in a game map are determined dynamically, and a game server using the same.

BACKGROUND OF THE DISCLOSURE

Battle royale games in which a large number of players compete with one another for survival and the last survivor becomes the winner have been popular with users thus far. In addition, with the recent success of the battle royale games such as PlayerUnknown's Battlegrounds, various battle royale games have been released.

By referring to an article from an Internet media (Reporter Yong-chan Gil of Game Insight, "Battle Royale Frenzy, 'The Golden Age' Has Not Come Yet", Feb. 14, 2019, http://www.gameinsight.co.kr/news/articleView.html?idxno=17572), it can be seen that after the success of the PlayerUnknown's Battlegrounds, various games of battle royale genre and existing games employing battle royale concepts are being released. However, as mentioned in the article above, a way of adapting the battle royale games has not been provided, and there is a possibility of mass producing boilerplate games in which a fixed number of the players repeat the game in a limited map.

Therefore, there is a need for a method that keeps the players interested in the battle royale games by adapting parameters to be used for determining environmental factors in the battle royale games dynamically for each match of the battle royale games.

SUMMARY OF THE DISCLOSURE

It is an object of the present disclosure to solve all the aforementioned problems.

It is another object of the present disclosure to allow players to play a close-range battle royale game with a changing number of competitors for each match by providing the close-range battle royale game in which the number of the players are determined dynamically.

It is still another object of the present disclosure to adapt parameters to be used for determining environmental factors even within a same game map of the battle royale game by providing the close-range battle royale game in which a permitted area, i.e., an area where the match is allowed to be played, is determined dynamically.

In order to accomplish objects above and characteristic effects to be described later of the present disclosure, distinctive configurations of the present disclosure are described as follows.

In accordance with one aspect of the present disclosure, there is provided a method for providing a close-range battle royale game in which a permitted number of players and one of permitted areas in a game map are determined dynamically, wherein a first state of the close-range battle royale game represents a state in which users log in to the close-range battle royale game and wait for one or more matches of the close-range battle royale game and wherein a second state of the close-range battle royale game represents a state in which the users play the matches as the players, including steps of: (a) a game server performing or supporting another device to perform (i) a process of determining a specific permitted number of the players by using a first algorithm, wherein the specific permitted number ranges from a minimum threshold to a maximum threshold, and (ii) a process of determining specific users, corresponding to the specific permitted number, as specific players, by referring to information on a specific counted number of the specific users in the first state at a specific point of time during waiting time before a specific match among the matches starts; (b) the game server performing or supporting another device to perform (i) a process of selecting a specific set of coordinates, to be used for a base point in a specific permitted area, among all sets of coordinates within the game map by using a second algorithm, (ii) a process of determining a specific size to be used for the specific permitted area by referring to information on the specific permitted number, and (iii) a process of determining the specific permitted area by referring to the specific set of the coordinates and the specific size; and (c) the game server performing or supporting another device to perform at least one of (i) a process of allowing the specific players in the second state to view information on the specific permitted area, and (ii) a process of determining each of starting positions of each of the specific players in the second state by referring to the information on the specific permitted area.

As one example, at the step of (a), the first algorithm is at least one of (i) an algorithm in which the specific point of time is randomly selected if the specific counted number is detected as equal to or greater than the minimum threshold, (ii) an algorithm in which the specific permitted number is determined by further referring to information on a time period wherein the time period is detected as having elapsed until the specific counted number reaches the minimum threshold, (iii) an algorithm in which the specific point of time is adjusted by further referring to information on a rate of increase in the specific counted number during a unit time, and (iv) an algorithm in which, if the specific counted number reaches the minimum threshold, the specific point of time is adjusted by further referring to information on each of experience levels of each of the specific users.

As one example, at the step of (b), the second algorithm is at least one of (i) an algorithm in which the specific set of the coordinates is randomly selected among predetermined sets of coordinate candidates, (ii) an algorithm in which the specific set of the coordinates is determined as a set of coordinates corresponding to one of points belonging to a least selected permitted area among the permitted areas by further referring to each piece of information on recent gameplay of each of the specific players, and (iii) an algorithm in which, if at least one of an average of experience levels, an average of accumulated wins and an average of past win ratios of the specific players is detected as being higher than their corresponding criterion thresholds, then the specific set of the coordinates is determined as a set of coordinates corresponding to one of points belonging to a difficult permitted area among the permitted areas wherein the difficult permitted area represents an area which contains terrains or sites to which a degree of complexity is assigned as a specific degree higher than a complexity threshold.

As one example, the game map includes (i) a first area corresponding to ground or sea, and (ii) a second area which is sky corresponding to the first area, wherein, at the step of (c), each of the starting positions is a position, within the second area, determined by referring to the information on the specific permitted area, and wherein each of avatars, corresponding to each of the specific players, carried by each of objects is displayed on each of the starting positions, and wherein each of the objects moves along a trajectory which passes through at least part of the second area corresponding to the specific permitted area.

As one example, at the step of (b), the specific set of the coordinates is selected among predetermined sets of coordinate candidates, and wherein information on the predetermined sets of the coordinate candidates is stored as corresponding to maximal size information representing each of sizes of maximally selectable permitted areas to be set on a basis of each of the predetermined sets of the coordinate candidates, and wherein the game server performs or supports another device to perform a process of determining the specific permitted area by further referring to the maximal size information.

As one example, the maximal size information is determined by referring to at least one of (i) information on a distance from the predetermined sets of the coordinate candidates to sea in the game map and (ii) information on a distance from the predetermined sets of the coordinate candidates to one or more preset special terrains in the game map.

As one example, at the step of (a), (i) each of one or more game lobbies corresponding to each of the matches is generated, (ii) each of the users selects one of the game lobbies and waits for a certain match, corresponding to said one of the game lobbies, among the matches, and (iii) each of permitted numbers of the players is determined by referring to each of counted numbers of the users corresponding to each of the game lobbies.

As one example, before the step of (b), the method further comprises a step of: (b0) if the specific permitted number is detected as equal to or greater than a group threshold, the game server performing or supporting another device to perform a process of dividing the specific players into two or more match groups by referring to information on each of experience levels of each of the specific players, and wherein, at the step of (b), the game server performs or supports another device to perform a process of determining each of the permitted areas corresponding to each of said two or more match groups.

As one example, at the step of (b), if each of the specific players is classified into each of said two or more match groups, the game server performs or supports another device to perform (i) a process of selecting each of classified sets of coordinates, to be used for each base point in each of the permitted areas corresponding to each of said two or more match groups, among all the sets of the coordinates within the game map, (ii) a process of determining each of sizes to be used for each of the permitted areas corresponding to each of said two or more match groups by referring to the information on each of the permitted numbers corresponding to each of said two or more match groups, and (iii) a process of determining each of the permitted areas by referring to each of the classified sets of the coordinates and its corresponding each of the sizes of the permitted areas.

In accordance with another aspect of the present disclosure, there is provided a game server for providing a close-range battle royale game in which a permitted number of players and one of permitted areas in a game map are determined dynamically, wherein a first state of the close-range battle royale game represents a state in which users log in to the close-range battle royale game and wait for one or more matches of the close-range battle royale game and wherein a second state of the close-range battle royale game represents a state in which the users play the matches as the players, including: at least one memory that stores instructions; and at least one processor configured to execute the instructions to perform or support another device to perform: (I) (i) a process of determining a specific permitted number of the players by using a first algorithm, wherein the specific permitted number ranges from a minimum threshold to a maximum threshold, and (ii) a process of determining specific users, corresponding to the specific permitted number, as specific players, by referring to information on a specific counted number of the specific users in the first state at a specific point of time during waiting time before a specific match among the matches starts; (II) (i) a process of selecting a specific set of coordinates, to be used for a base point in a specific permitted area, among all sets of coordinates within the game map by using a second algorithm, (ii) a process of determining a specific size to be used for the specific permitted area by referring to information on the specific permitted number, and (iii) a process of determining the specific permitted area by referring to the specific set of the coordinates and the specific size; and (III) at least one of (i) a process of allowing the specific players in the second state to view information on the specific permitted area, and (ii) a process of determining each of starting positions of each of the specific players in the second state by referring to the information on the specific permitted area.

As one example, at the process of (I), the first algorithm is at least one of (i) an algorithm in which the specific point of time is randomly selected if the specific counted number is detected as equal to or greater than the minimum threshold, (ii) an algorithm in which the specific permitted number is determined by further referring to information on a time period wherein the time period is detected as having elapsed until the specific counted number reaches the minimum threshold, (iii) an algorithm in which the specific point of time is adjusted by further referring to information on a rate of increase in the specific counted number during a unit time, and (iv) an algorithm in which, if the specific counted number reaches the minimum threshold, the specific point of time is adjusted by further referring to information on each of experience levels of each of the specific users.

As one example, at the process of (II), the second algorithm is at least one of (i) an algorithm in which the specific set of the coordinates is randomly selected among predetermined sets of coordinate candidates, (ii) an algorithm in which the specific set of the coordinates is determined as a set of coordinates corresponding to one of points belonging to a least selected permitted area among the permitted areas by further referring to each piece of information on recent gameplay of each of the specific players, and (iii) an algorithm in which, if at least one of an average of experience levels, an average of accumulated wins and an average of past win ratios of the specific players is detected as being higher than their corresponding criterion thresholds, then the specific set of the coordinates is determined as a set of coordinates corresponding to one of points belonging to a difficult permitted area among the permitted areas wherein the difficult permitted area represents an area which contains terrains or sites to which a degree of complexity is assigned as a specific degree higher than a complexity threshold.

As one example, the game map includes (i) a first area corresponding to ground or sea, and (ii) a second area which is sky corresponding to the first area, wherein, at the process of (III), each of the starting positions is a position, within the second area, determined by referring to the information on the specific permitted area, and wherein each of avatars, corresponding to each of the specific players, carried by each of objects is displayed on each of the starting positions, and wherein each of the objects moves along a trajectory which passes through at least part of the second area corresponding to the specific permitted area.

As one example, at the process of (II), the specific set of the coordinates is selected among predetermined sets of coordinate candidates, and wherein information on the predetermined sets of the coordinate candidates is stored as corresponding to maximal size information representing each of sizes of maximally selectable permitted areas to be set on a basis of each of the predetermined sets of the coordinate candidates, and wherein the processor performs or supports another device to perform a process of determining the specific permitted area by further referring to the maximal size information.

As one example, the maximal size information is determined by referring to at least one of (i) information on a distance from the predetermined sets of the coordinate candidates to sea in the game map and (ii) information on a distance from the predetermined sets of the coordinate candidates to one or more preset special terrains in the game map.

As one example, at the process of (I), (i) each of one or more game lobbies corresponding to each of the matches is generated, (ii) each of the users selects one of the game lobbies and waits for a certain match, corresponding to said one of the game lobbies, among the matches, and (iii) each of permitted numbers of the players is determined by referring to each of counted numbers of the users corresponding to each of the game lobbies.

As one example, before the process of (II), the processor further performs or supports another device to perform: (II-0) if the specific permitted number is detected as equal to or greater than a group threshold, a process of dividing the specific players into two or more match groups by referring to information on each of experience levels of each of the specific players, and wherein, at the process of (II), the processor performs or supports another device to perform a process of determining each of the permitted areas corresponding to each of said two or more match groups.

As one example, at the process of (II), if each of the specific players is classified into each of said two or more match groups, the processor performs or supports another device to perform (i) a process of selecting each of classified sets of coordinates, to be used for each base point in each of the permitted areas corresponding to each of said two or more match groups, among all the sets of the coordinates within the game map, (ii) a process of determining each of sizes to be used for each of the permitted areas corresponding to each of said two or more match groups by referring to the information on each of the permitted numbers corresponding to each of said two or more match groups, and (iii) a process of determining each of the permitted areas by referring to each of the classified sets of the coordinates and its corresponding each of the sizes of the permitted areas.

BRIEF DESCRIPTION OF THE DRAWINGS

The above and other objects and features of the present disclosure will become apparent from the following description of preferred embodiments given in conjunction with the accompanying drawings, in which.

DETAILED DESCRIPTION OF THE PREFERRED EMBODIMENTS

In the following detailed description, reference is made to the accompanying drawings that show, by way of illustration, specific embodiments in which the disclosure may be practiced. These embodiments are described in sufficient detail to enable those skilled in the art to practice the disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure.

In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar components throughout the several aspects.

As used in this specification and the appended claims, the singular forms "a," "an," and "the" include plural referents unless the content and context clearly dictates otherwise.

The headings and abstract of the present disclosure provided herein are for convenience only and do not limit or interpret the scope or meaning of the embodiments.

To allow those skilled in the art to the present disclosure to be carried out easily, the example embodiments of the present disclosure by referring to attached diagrams will be explained in detail as shown below.

Figure 1:
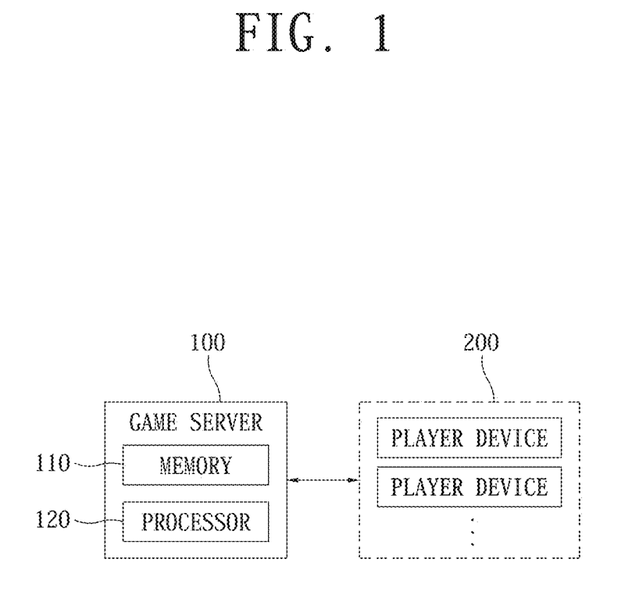
FIG. 1 is a drawing schematically illustrating a game server for providing a close-range battle royale game in which a permitted number of players and one of permitted areas in a game map are determined dynamically in accordance with one example embodiment of the present disclosure.

FIG. 1 is a drawing schematically illustrating a game server for providing a close-range battle royale game in which a permitted number of players and one of permitted areas, i.e., areas where one or more matches are allowed to be played, in a game map are determined dynamically in accordance with one example embodiment of the present disclosure. Herein, parameters to be used for determining environmental factors in the close-range battle royale game may be dynamically adapted. The factors may represent elements existing in the close-range battle royale game, such as the number of the players participating in the matches, one or more areas where the players compete with one another for survival, etc., but the scope of the present disclosure is not limited thereto. And the parameters may represent values respectively corresponding to the factors, such as time required for determining the number of the players, information on permitted area candidates to be used for determining the areas where the players compete with one another for survival, etc., but the scope of the present disclosure is not limited thereto.

By referring to FIG. 1, the game server may include a memory and a processor 120. Herein, the memory 110 may store instructions for the processor, and in detail, the instructions may be code generated to allow the game server 100 to function in a specific way, and may be stored in the memory usable or readable by a computer. The instructions may execute the processes described in the present disclosure.

And the processor 120 may include hardware configuration of MPU (Micro Processing Unit) or CPU (Central Processing Unit), cache memory, data bus, etc. Additionally, any OS (operating system) and software configuration of applications that achieve specific purposes may further be included.

Also, the game server 100 may be connected with multiple player devices 200 to provide the players with the close-range battle royale game by transmitting and receiving game data. Herein, the player devices 200 may be digital devices capable of connecting and communicating with the game server 100. And the player devices 200 may include any digital devices with processors capable of computation and having memories, such as a desktop computer, a notebook computer, a workstation, a PDA, a web pad, a mobile phone, etc.

Figure 2:
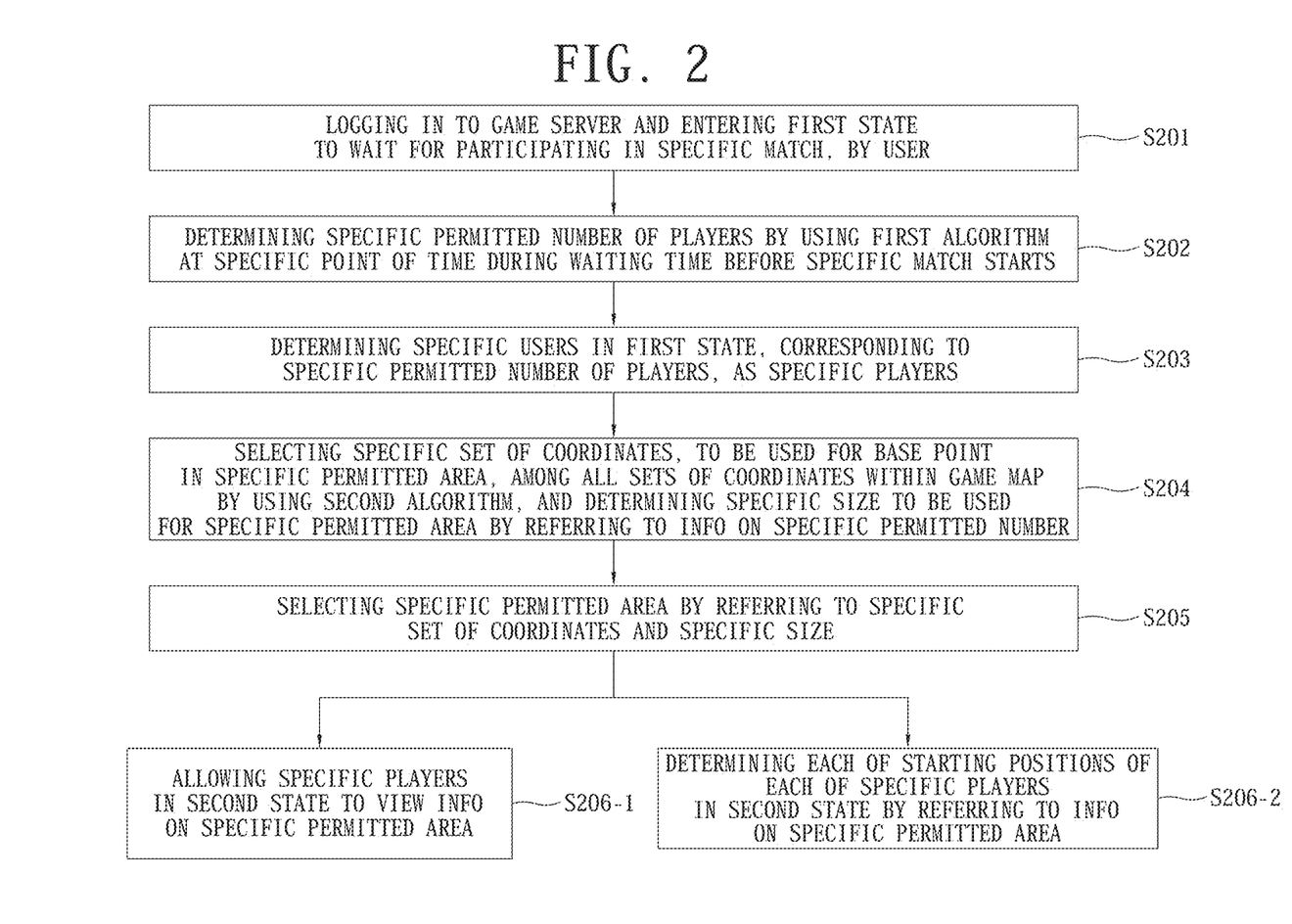
FIG. 2 is a flowchart schematically illustrating processes of providing the close-range battle royale game in which the permitted number of the players and one of the permitted areas in the game map are determined dynamically in accordance with one example embodiment of the present disclosure.

FIG. 2 is a flowchart schematically illustrating processes of providing the close-range battle royale game in accordance with one example embodiment of the present disclosure.

By referring to FIG. 2, in the close-range battle royale game programmed in accordance with one example embodiment of the present disclosure, a user who has logged in to the game server (i) may select a start button etc. to be used for entering a first state to participate as one of specific players in a specific match among the matches of the close-range battle royale game, and (ii) may enter the first state to wait for other users to participate and to wait for the specific match to start, at a step of S201. Herein, the first state of the close-range battle royale game may represent a state in which users log in to the close-range battle royale game and wait for the matches and a second state of the close-range battle royale game may represent a state in which the users play the matches as the players. As one example, the close-range battle royale game may be programmed to allow the user to be in the first state at once when the user logs in.

Next, the processor 120 of the game server 100 may perform or support another device to perform a process of determining a specific permitted number of the players by using a first algorithm by referring to information on a specific counted number of specific users in the first state at a specific point of time during waiting time before the specific match starts, at a step of S202. Herein, the specific permitted number may range from a minimum threshold to a maximum threshold. Further, the first algorithm to be used for determining the specific permitted number may be at least one of (i) an algorithm in which the specific point of time is randomly selected if the specific counted number is detected as equal to or greater than the minimum threshold, (ii) an algorithm in which the specific permitted number is determined by further referring to information on a time period wherein the time period is detected as having elapsed until the specific counted number reaches the minimum threshold, (iii) an algorithm in which the specific point of time is adjusted by further referring to information on a rate of increase in the specific counted number during a unit time, and (iv) an algorithm in which, if the specific counted number reaches the minimum threshold, the specific point of time is adjusted by further referring to information on each of experience levels of each of the specific users. For example, an increase of the players may be expected to be small even if the waiting time is extended, in case that the time period is detected as equal to or greater than a time threshold. Therefore, the specific point of time may be hastened. As another example, if the rate of the increase in the specific counted number during the unit time is equal to or greater than a rate threshold, then the specific point of time may be delayed to allow more users to participate in the specific match.

The first algorithm is not limited to the description above, and the close-range battle royale game may be programmed to use any other algorithm containing other sequences, formulas etc. to be used for determining the specific permitted number of the players as the case may be.

Thereafter, the processor 120 may perform or support another device to perform a process of determining the specific users in the first state, corresponding to the specific permitted number of the players, as specific players who participate in the specific match, at a step of S203. Herein, the waiting time may still remain until the specific match starts even though the specific players are determined, and in that case, a start of the specific match may have to wait until the whole waiting time is elapsed. However, as another example, each of game screens seen by each of the users may display a selectable button, and if it is detected that all the users have selected the button, then the specific match may start even though the waiting time is not completely elapsed yet.

Next, the processor 120 may perform or support another device to perform (i) a process of selecting a specific set of coordinates, to be used for a base point in a specific permitted area, among all sets of coordinates within the game map by using a second algorithm, (ii) a process of determining a specific size to be used for the specific permitted area by referring to information on the specific permitted number, at a step of S204, and (iii) a process of determining the specific permitted area by referring to the specific set of the coordinates and the specific size, at a step of S205. Herein, the second algorithm to be used for selecting the specific set of the coordinates may be at least one of (i) an algorithm in which the specific set of the coordinates is randomly selected among predetermined sets of coordinate candidates, (ii) an algorithm in which the specific set of the coordinates is determined as a set of coordinates corresponding to one of points belonging to a least selected permitted area among the permitted areas by further referring to each piece of information on recent gameplay of each of the specific players, (iii) an algorithm in which, if at least one of an average of experience levels, an average of accumulated wins and an average of past win ratios of the specific players is detected as being higher than their corresponding criterion thresholds, then the specific set of the coordinates is determined as a set of coordinates corresponding to one of points belonging to a difficult permitted area among the permitted areas, and herein, the difficult permitted area may represent an area which contains terrains or sites to which a degree of complexity is assigned as a specific degree higher than a complexity threshold. Herein, the second algorithm is not limited thereto, and the close-range battle royale game may be programmed to use any other algorithm containing other sequences, formulas, etc. to be used for selecting the specific set of the coordinates as the case may be. Also, the predetermined sets of the coordinate candidates may be respective sets of coordinates of predetermined points within the game map and may serve as sets of coordinate candidates of the specific permitted area. Herein, a set of coordinates of a point represents a set of (a, b, c) values on (x, y, z) axes corresponding to the point.

Then the processor 120 may perform or support another device to perform a process of allowing the specific players in the second state to view information on the specific permitted area, at a step of S206-1. Herein, as examples of the information on the specific permitted area seen by the specific players, the close-range battle royale game may be programmed to display an area, corresponding to the specific permitted area, among the whole game map, or display the information on the specific permitted area on a separate minimap viewable by the specific players in the second state.

Also, the processor 120 may perform or support another device to perform a process of determining each of starting positions of each of the specific players in the second state by referring to the information on the specific permitted area, at a step of S206-2. Herein, each of the starting positions may allow each of the specific players in the second state to play the specific match in the specific permitted area. Accordingly, each of the starting positions may be a position near or inside the specific permitted area. As another example, each of the starting positions may be a position far from the specific permitted area, and the close-range battle royale game may be programmed to move an avatar of a player from such a position to the specific permitted area.

Herein, execution orders and details of (i) a process of allowing the specific players in the second state to view the information on the specific permitted area, at the step of S206-1, and (ii) a process of determining each of the starting positions of each of the specific players in the second state, at the step of S206-2 are not limited to the description above, and may be programmed to vary within a scope of the present disclosure as the case may be.

As another example, in case that the matches are to be played, (i) each of one or more game lobbies corresponding to each of the matches may be generated, and (ii) each of the users may select one of the game lobbies and wait for a certain match, corresponding to said one of the game lobbies, among the matches. Herein, each of permitted numbers of the players may be determined by referring to each of counted numbers of the users corresponding to each of the game lobbies.

And as another example, if the specific permitted number is detected as equal to or greater than a group threshold, the processor 120 may perform or support another device to perform a process of dividing the specific players into two or more match groups by referring to information on each of the experience levels of each of the specific players, and a process of determining each of the permitted areas corresponding to each of said two or more match groups. The process of determining each of the permitted areas corresponding to each of said two or more match groups is described in detail as follows. If each of the specific players is classified into each of said two or more match groups, the processor 120 may perform or support another device to perform (i) a process of selecting each of classified sets of coordinates, to be used for each base point in each of the permitted areas corresponding to each of said two or more match groups, among all the sets of the coordinates within the game map, (ii) a process of determining each of sizes to be used for each of the permitted areas corresponding to each of said two or more match groups by referring to the information on each of the permitted numbers corresponding to each of said two or more match groups, and (iii) a process of determining each of the permitted areas by referring to each of the classified sets of the coordinates and its corresponding each of the sizes of the permitted areas.

Figure 3:
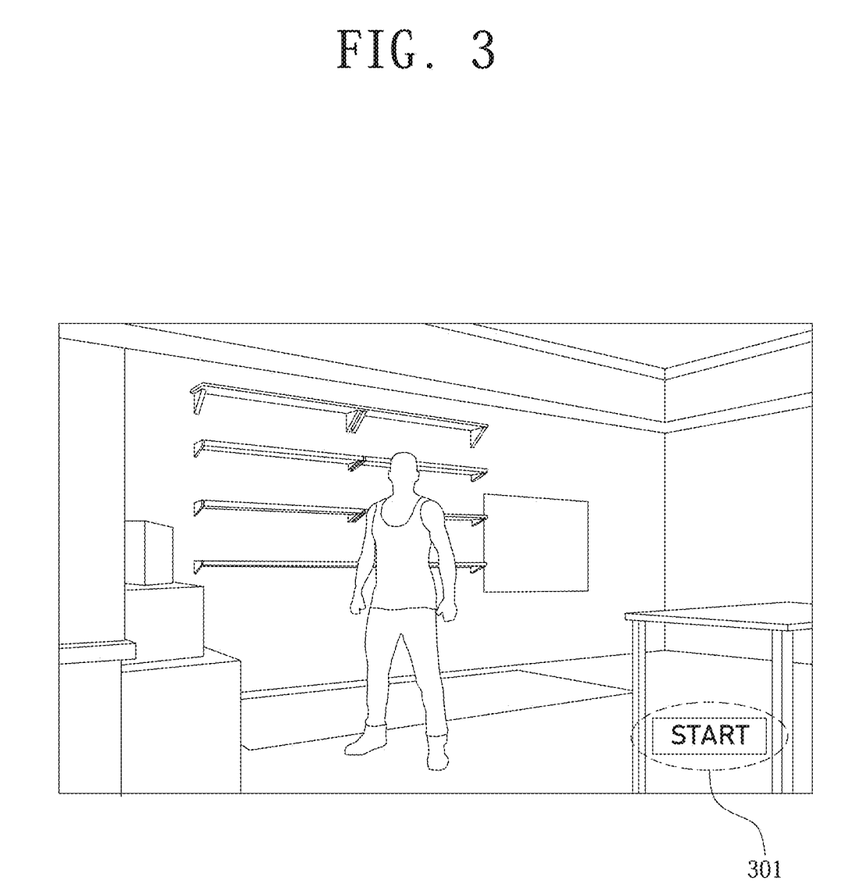
FIG. 3 is a drawing schematically illustrating a game screen displaying a button to be used for entering a first state to wait for participating in a match by a user in accordance with one example embodiment of the present disclosure.

FIG. 3 is a drawing schematically illustrating a game screen displaying a button to be used for entering the first state to wait for participating in the specific match by the user, i.e., one of the specific users, in accordance with one example embodiment of the present disclosure.

By referring to FIG. 3, in the close-range battle royale game, the user who has logged in to the game server 100 may be provided with the start button 301 to be used for entering the first state to wait for participating in the specific match in accordance with one example embodiment of the present disclosure. Herein, the user may select the start button 301 to enter the first state and may wait for other users to participate and wait for the specific match to start. Also, a shape, a location, etc. of the start button 301 may be programmed to vary as the case may be.

Figure 4A:
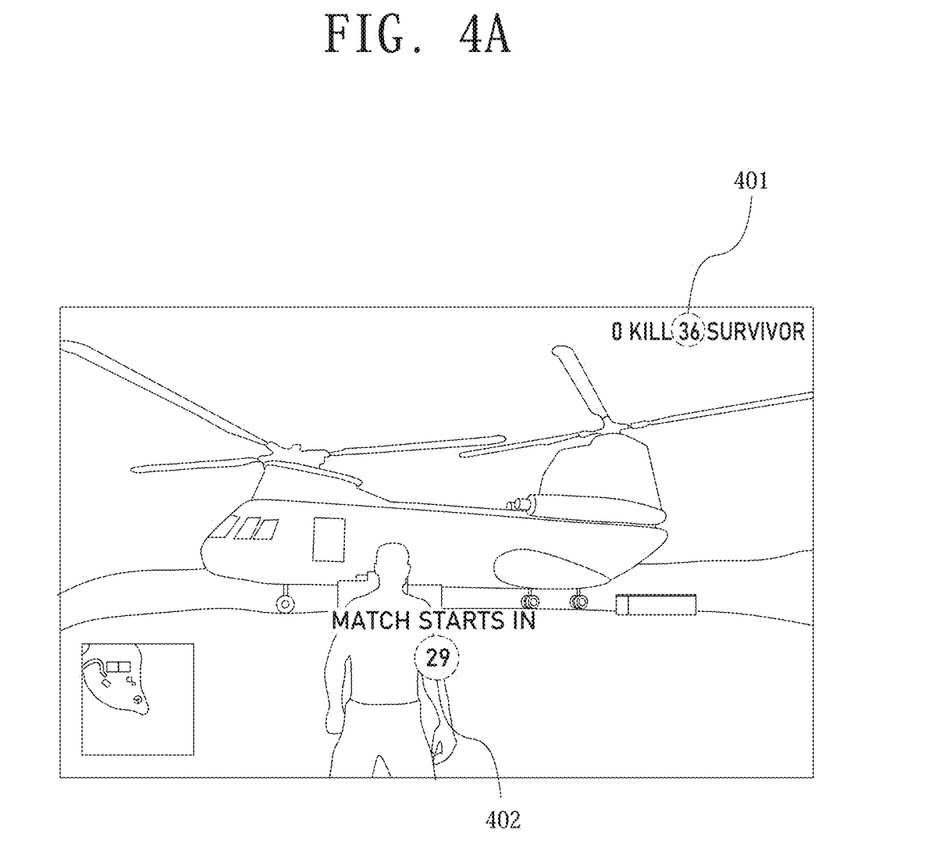
FIG. 4A is a drawing schematically illustrating a game screen seen by the user in the first state in accordance with one example embodiment of the present disclosure.

FIG. 4A is a drawing schematically illustrating a game screen seen by the user, i.e., one of the specific users, in the first state in accordance with one example embodiment of the present disclosure.

The user in a state corresponding to the game screen as shown in FIG. 4A may be in the first state and may wait for the specific match to start during the waiting time. For example, the close-range battle royale game may be programmed to allow the waiting time to be counted down to 0. Herein, the remaining waiting time 402 may be displayed on the game screen. Also, a changing number 401 may be displayed on the game screen. Herein, the number 401 may change in real-time as corresponding to the specific counted number of the specific users who wait to participate in the specific match. If the processor 120 finalizes the specific permitted number of the players for the specific match by using the first algorithm, the number 401 corresponding to the specific permitted number may be displayed.

Figure 4B:
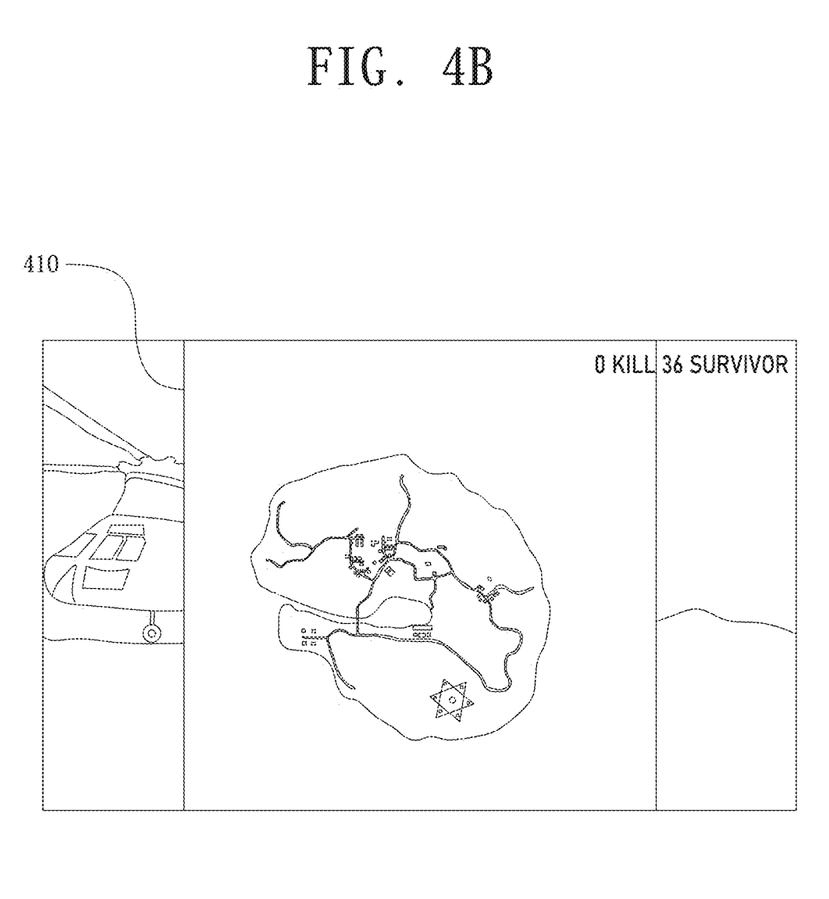
FIG. 4B is a drawing schematically illustrating a game screen displaying a minimap seen by the user in the first state in accordance with one example embodiment of the present disclosure.

FIG. 4B is a drawing schematically illustrating a game screen displaying the minimap seen by the user, i.e., one of the specific users, in the first state in accordance with one example embodiment of the present disclosure.

By referring to FIG. 4B, in the close-range battle royale game, the specific users may view information on the game map, where the specific match is to be played, by using the minimap even in the first state before the specific match starts. However, the minimap provided to the specific users in the first state does not display the information on the specific permitted area, and the specific users may view the minimap displaying limited information only.

Figure 5A:
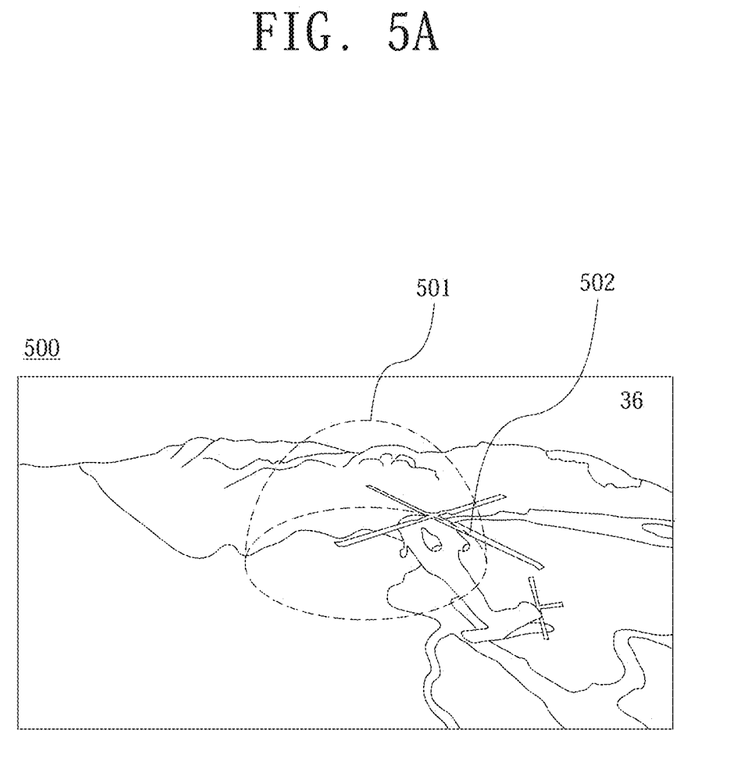
FIG. 5A is a drawing schematically illustrating a game screen displaying the game map, a specific permitted area, and an object carrying an avatar corresponding to the user as one of specific players after the match starts in accordance with one example embodiment of the present disclosure.

FIG. 5A is a drawing schematically illustrating a game screen displaying the game map, the specific permitted area, and an object carrying the avatar corresponding to the user as one of the specific players after the specific match starts, in accordance with one example embodiment of the present disclosure.

By referring to FIG. 5A, in the close-range battle royale game, the game map 500 may include (i) a first area corresponding to ground or sea, and (ii) a second area which is sky corresponding to the first area. And the specific permitted area determined by the processor 120 may be displayed over at least part of the first area. As shown in FIG. 5A, the specific permitted area 501 may be indicated by a translucent shape containing the specific permitted area 501, but the scope of the present disclosure is not limited thereto. For example, a perimeter of the specific permitted area 501 may be in a specific color, or objects indicating the perimeter may be displayed.

Also, the processor 120 may perform or support another device to perform a process of determining one or more positions in the second area, i.e., aerial space, on the game map as the starting positions of the specific players in the second state, by referring to the information on the specific permitted area 501. Herein, each object 502 programmed to be in a shape of a cargo helicopter may be displayed on each of the starting positions. And the avatar corresponding to one of the specific players may be displayed as carried by the object in the shape of the cargo helicopter. However, as another example, all the starting positions of all the specific players participating in the specific match may be determined as located within a certain range, and the single object 502 in the shape of the cargo helicopter in which all the starting positions within the certain range are located may be displayed. Thus the specific match may start with the single cargo helicopter carrying all of avatars respectively corresponding to all the specific players participating in the specific match. However, the scope of the present disclosure is not limited thereto, and each of the specific players may start playing the specific match from each of the starting positions separated with one another by more than a certain interval. As still another example, each of multiple objects, corresponding to each of the specific players, in the shape of the cargo helicopter may be displayed.

And, the object 502 in the shape of the cargo helicopter may move along a trajectory which passes through at least part of the second area corresponding to the specific permitted area 501. In the processes as such, the avatars, respectively corresponding to the specific players, carried by the object 502 in the shape of the cargo helicopter may descend toward the specific permitted area 501 to allow the specific players to play the specific match in the specific permitted area 501. However, the scope of the present disclosure is not limited thereto, and the close-range battle royale game may be programmed to allow the avatars of the specific players to enter the specific permitted area 501 in various ways as the case may be.

Figure 5B:
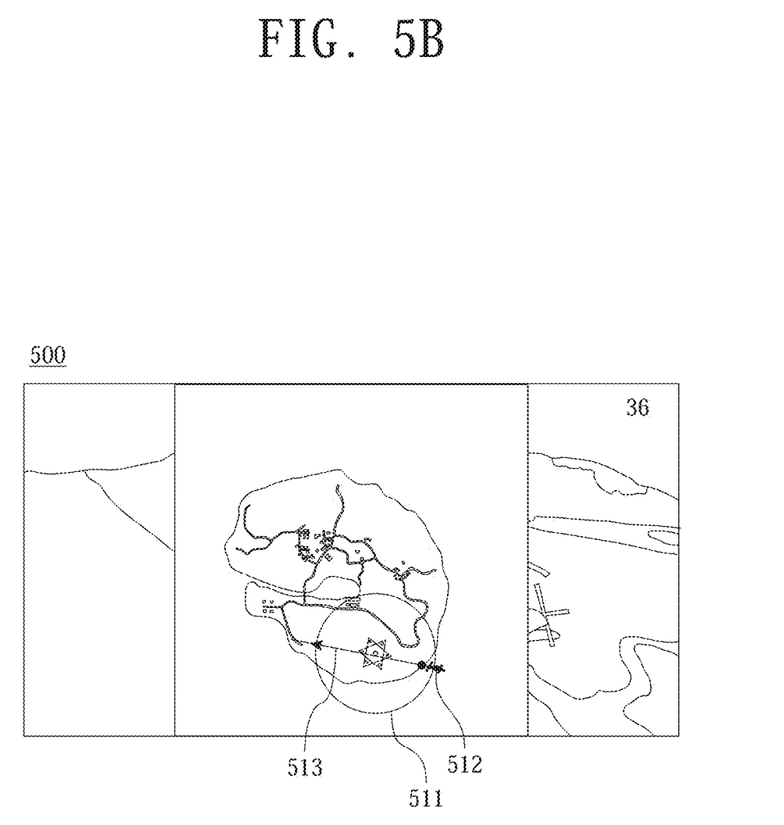
FIG. 5B is a drawing schematically illustrating a game screen displaying information such as the minimap, the specific permitted area, a trajectory of the object, and a current position of the avatar, etc. seen by one of the specific players participating in the match in accordance with one example embodiment of the present disclosure.

FIG. 5B is a drawing schematically illustrating a game screen displaying information such as the minimap, the specific permitted area, a trajectory of the object, and a current position of the avatar, etc., seen by the specific players participating in the specific match after the specific match starts in accordance with one example embodiment of the present disclosure.

By referring to FIG. 5B, the specific players participating in the specific match may view the minimap 510 further displaying information on the specific permitted area 511, the current location 512 of the avatar, the trajectory 513 of the object in the shape of the cargo helicopter, etc., as an example different from the minimap 410 viewable in the first state.

Figure 6:
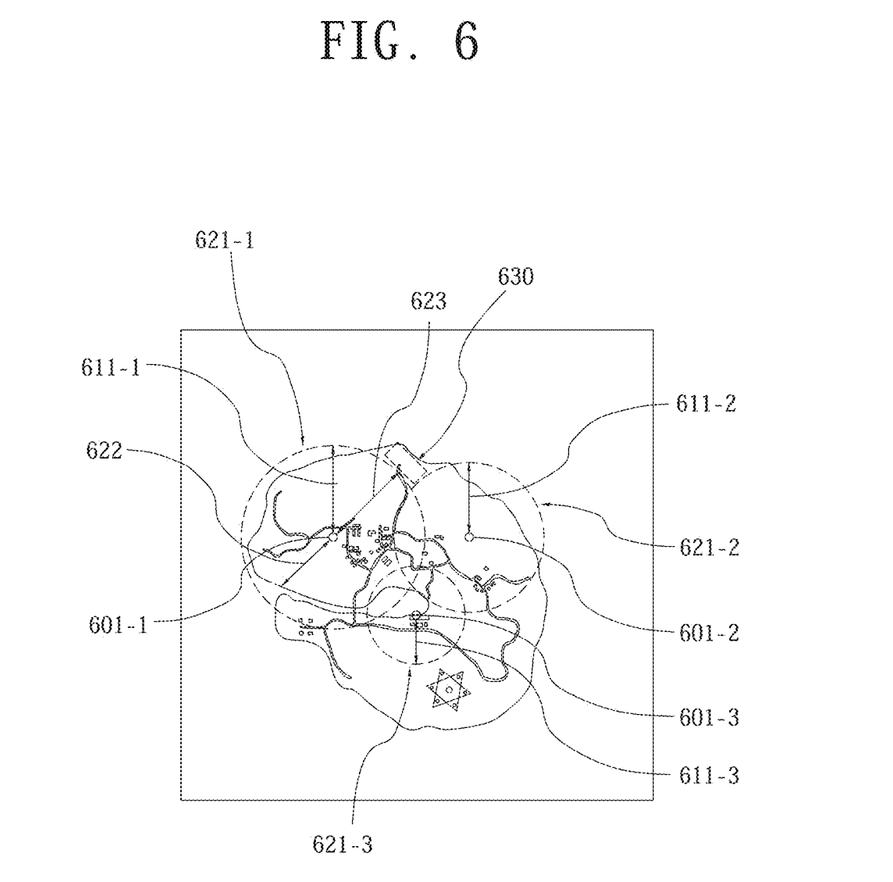
FIG. 6 is a drawing schematically illustrating examples of specific permitted areas and their relevant details in accordance with one example embodiment of the present disclosure.

FIG. 6 is a drawing schematically illustrating examples of the specific permitted areas and their relevant details in accordance with one example embodiment of the present disclosure.

By referring to FIG. 6, processes of determining the specific permitted area for a single match group in accordance with one example embodiment of the present disclosure are described in detail as follows.

The processor 120 may perform or support another device to perform a process of selecting a point 601-1 on the specific set of the coordinates among the predetermined sets of the coordinate candidates by using the second algorithm. Herein, the specific set of the coordinates may be used for a base point in the specific permitted area.

Information on the predetermined sets of the coordinate candidates may be stored as corresponding to maximal size information representing each of sizes of maximally selectable specific permitted areas to be set on a basis of each of the predetermined sets of the coordinate candidates. As one example, the maximal size information corresponding to the point 601-1 on the specific set of the coordinates as shown in FIG. 6 may be determined by referring to at least one of (i) information on a distance 622 from the point 601-1 to sea in the game map and (ii) information on a distance 623 from the point 601-1 to a preset special terrain 630 in the game map. Herein, preset special terrains may be terrains such as mountain ranges which may be programmed to serve as the perimeter of the specific permitted areas.

Next, the processor 120 may perform or support another device to perform a process of adjusting the specific size 611-1 of the specific permitted area by referring to the information on the specific permitted number of the players. Herein, the specific size may be proportional to the specific permitted number. Further, shapes of the specific permitted areas may be circles, but the scope of the present disclosure is not limited thereto, and the specific permitted areas may be in various shapes such as rectangles, hexagons, etc. as the case may be.

Then, the processor 120 may perform or support another device to perform a process of determining the specific permitted area 621-1 by referring to the point 601-1 on the specific set of the coordinates and the specific size 611-1. If the maximal size information corresponding to the information about the point 601-1 on the specific set is detected as present, the processor may perform or support another device to perform a process of determining the specific permitted area to have a smaller size by referring to the maximal size information.

In case the match groups are more than one, each of the specific permitted areas corresponding to each of the match groups may be determined through similar processes as above. For example, if the specific players are divided into three match groups, then the specific permitted areas 621-1, 621-2, and 621-3 may be determined by using the points 601-1, 601-2, and 601-3 on the specific sets of the coordinates, and the specific sizes 611-1, 611-2, and 611-3. If the maximal size information corresponding to the information about the points 601-1, 601-2, and 601-3 on the predetermined sets of the coordinate candidates is detected as present, the processor 120 may perform or support another device to perform a process of determining the specific permitted areas to have smaller sizes by referring to their corresponding maximal size information.

The present disclosure has an effect of providing the close-range battle royale game in which parameters to be used for determining environmental factors in the close-range battle royale games are changed flexibly by dynamically determining the permitted number of the players and one of the permitted areas in the game map, unlike fixated parameters to be used for determining environmental factors in conventional battle royale games.

The present disclosure has another effect of allowing the players to play the close-range battle royale game with a changing number of competitors for each match by providing the close-range battle royale game in which the number of the players are determined dynamically.

The present disclosure has still another effect of adapting parameters to be used for determining environmental factors even within a same game map of the close-range battle royale games by providing the close-range battle royale game in which the permitted areas are determined dynamically.

The embodiments of the present disclosure as explained above can be implemented in a form of executable program command through a variety of computer means recordable in computer readable media. The computer readable media may include solely or in combination, program commands, data files, and data structures. The program commands recorded in the media may be components specially designed for the present disclosure or may be usable to those skilled in the art in a field of computer software. Computer readable media may include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which may be executable by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for providing a close-range battle royale game in which a permitted number of players and one of permitted areas in a game map are determined dynamically, wherein a first state of the close-range battle royale game represents a state in which users log in to the close-range battle royale game and wait for one or more matches of the close-range battle royale game and wherein a second state of the close-range battle royale game represents a state in which the users play the matches as the players, comprising steps of:
   (a) a game server performing or supporting another device to perform (i) a process of determining a specific permitted number of the players by using a first algorithm, wherein the specific permitted number ranges from a minimum threshold to a maximum threshold, and (ii) a process of determining specific users, corresponding to the specific permitted number, as specific players, by referring to information on a specific counted number of the specific users in the first state at a specific point of time during waiting time before a specific match among the matches starts;
   (b) the game server performing or supporting another device to perform (i) a process of selecting a specific set of coordinates, to be used for a base point in a specific permitted area, among all sets of coordinates within the game map by using a second algorithm, (ii) a process of determining a specific size to be used for the specific permitted area by referring to information on the specific permitted number, and (iii) a process of determining the specific permitted area by referring to the specific set of the coordinates and the specific size; and
   (c) the game server performing or supporting another device to perform at least one of (i) a process of allowing the specific players in the second state to view information on the specific permitted area, and (ii) a process of determining each of starting positions of each of the specific players in the second state by referring to the information on the specific permitted area.

2. The method of claim 1, wherein, at the step of (a), the first algorithm is at least one of (i) an algorithm in which the specific point of time is randomly selected if the specific counted number is detected as equal to or greater than the minimum threshold, (ii) an algorithm in which the specific permitted number is determined by further referring to information on a time period wherein the time period is detected as having elapsed until the specific counted number reaches the minimum threshold, (iii) an algorithm in which the specific point of time is adjusted by further referring to information on a rate of increase in the specific counted number during a unit time, and (iv) an algorithm in which, if the specific counted number reaches the minimum threshold, the specific point of time is adjusted by further referring to information on each of experience levels of each of the specific users.

3. The method of claim 1, wherein, at the step of (b), the second algorithm is at least one of (i) an algorithm in which the specific set of the coordinates is randomly selected among predetermined sets of coordinate candidates, (ii) an algorithm in which the specific set of the coordinates is determined as a set of coordinates corresponding to one of points belonging to a least selected permitted area among the permitted areas by further referring to each piece of information on recent gameplay of each of the specific players, and (iii) an algorithm in which, if at least one of an average of experience levels, an average of accumulated wins and an average of past win ratios of the specific players is detected as being higher than their corresponding criterion thresholds, then the specific set of the coordinates is determined as a set of coordinates corresponding to one of points belonging to a difficult permitted area among the permitted areas wherein the difficult permitted area represents an area which contains terrains or sites to which a degree of complexity is assigned as a specific degree higher than a complexity threshold.

4. The method of claim 1, wherein the game map includes (i) a first area corresponding to ground or sea, and (ii) a second area which is sky corresponding to the first area,
    wherein, at the step of (c), each of the starting positions is a position, within the second area, determined by referring to the information on the specific permitted area, and wherein each of avatars, corresponding to each of the specific players, carried by each of objects is displayed on each of the starting positions, and
    wherein each of the objects moves along a trajectory which passes through at least part of the second area corresponding to the specific permitted area.

5. The method of claim 1, wherein, at the step of (b), the specific set of the coordinates is selected among predetermined sets of coordinate candidates, and
    wherein information on the predetermined sets of the coordinate candidates is stored as corresponding to maximal size information representing each of sizes of maximally selectable permitted areas to be set on a basis of each of the predetermined sets of the coordinate candidates, and wherein the game server performs or supports another device to perform a process of determining the specific permitted area by further referring to the maximal size information.

6. The method of claim 5, wherein the maximal size information is determined by referring to at least one of (i) information on a distance from the predetermined sets of the coordinate candidates to sea in the game map and (ii) information on a distance from the predetermined sets of the coordinate candidates to one or more preset special terrains in the game map.

7. The method of claim 1, wherein, at the step of (a), (i) each of one or more game lobbies corresponding to each of the matches is generated, (ii) each of the users selects one of the game lobbies and waits for a certain match, corresponding to said one of the game lobbies, among the matches, and (iii) each of permitted numbers of the players is determined by referring to each of counted numbers of the users corresponding to each of the game lobbies.

8. The method of claim 7, wherein, before the step of (b), the method further comprises a step of:
    (b0) if the specific permitted number is detected as equal to or greater than a group threshold, the game server performing or supporting another device to perform a process of dividing the specific players into two or more match groups by referring to information on each of experience levels of each of the specific players, and
    wherein, at the step of (b), the game server performs or supports another device to perform a process of determining each of the permitted areas corresponding to each of said two or more match groups.

9. The method of claim 8, wherein, at the step of (b), if each of the specific players is classified into each of said two or more match groups, the game server performs or supports another device to perform (i) a process of selecting each of classified sets of coordinates, to be used for each base point in each of the permitted areas corresponding to each of said two or more match groups, among all the sets of the coordinates within the game map, (ii) a process of determining each of sizes to be used for each of the permitted areas corresponding to each of said two or more match groups by referring to the information on each of the permitted numbers corresponding to each of said two or more match groups, and (iii) a process of determining each of the permitted areas by referring to each of the classified sets of the coordinates and its corresponding each of the sizes of the permitted areas.

10. A game server for providing a close-range battle royale game in which a permitted number of players and one of permitted areas in a game map are determined dynamically, wherein a first state of the close-range battle royale game represents a state in which users log in to the close-range battle royale game and wait for one or more matches of the close-range battle royale game and wherein a second state of the close-range battle royale game represents a state in which the users play the matches as the players, comprising:
    at least one memory that stores instructions; and
    at least one processor configured to execute the instructions to perform or support another device to perform: (I) (i) a process of determining a specific permitted number of the players by using a first algorithm, wherein the specific permitted number ranges from a minimum threshold to a maximum threshold, and (ii) a process of determining specific users, corresponding to the specific permitted number, as specific players, by referring to information on a specific counted number of the specific users in the first state at a specific point of time during waiting time before a specific match among the matches starts; (II) (i) a process of selecting a specific set of coordinates, to be used for a base point in a specific permitted area, among all sets of coordinates within the game map by using a second algorithm, (ii) a process of determining a specific size to be used for the specific permitted area by referring to information on the specific permitted number, and (iii) a process of determining the specific permitted area by referring to the specific set of the coordinates and the specific size; and (III) at least one of (i) a process of allowing the specific players in the second state to view information on the specific permitted area, and (ii) a process of determining each of starting positions of each of the specific players in the second state by referring to the information on the specific permitted area.

11. The game server of claim 10, wherein, at the process of (I), the first algorithm is at least one of (i) an algorithm in which the specific point of time is randomly selected if the specific counted number is detected as equal to or greater than the minimum threshold, (ii) an algorithm in which the specific permitted number is determined by further referring to information on a time period wherein the time period is detected as having elapsed until the specific counted number reaches the minimum threshold, (iii) an algorithm in which the specific point of time is adjusted by further referring to information on a rate of increase in the specific counted number during a unit time, and (iv) an algorithm in which, if the specific counted number reaches the minimum threshold, the specific point of time is adjusted by further referring to information on each of experience levels of each of the specific users.

12. The game server of claim 10, wherein, at the process of (II), the second algorithm is at least one of (i) an algorithm in which the specific set of the coordinates is randomly selected among predetermined sets of coordinate candidates, (ii) an algorithm in which the specific set of the coordinates is determined as a set of coordinates corresponding to one of points belonging to a least selected permitted area among the permitted areas by further referring to each piece of information on recent gameplay of each of the specific players, and (iii) an algorithm in which, if at least one of an average of experience levels, an average of accumulated wins and an average of past win ratios of the specific players is detected as being higher than their corresponding criterion thresholds, then the specific set of the coordinates is determined as a set of coordinates corresponding to one of points belonging to a difficult permitted area among the permitted areas wherein the difficult permitted area represents an area which contains terrains or sites to which a degree of complexity is assigned as a specific degree higher than a complexity threshold.

13. The game server of claim 10, wherein the game map includes (i) a first area corresponding to ground or sea, and (ii) a second area which is sky corresponding to the first area,
wherein, at the process of (III), each of the starting positions is a position, within the second area, determined by referring to the information on the specific permitted area, and wherein each of avatars, corresponding to each of the specific players, carried by each of objects is displayed on each of the starting positions, and
wherein each of the objects moves along a trajectory which passes through at least part of the second area corresponding to the specific permitted area.

14. The game server of claim 10, wherein, at the process of (II), the specific set of the coordinates is selected among predetermined sets of coordinate candidates, and
wherein information on the predetermined sets of the coordinate candidates is stored as corresponding to maximal size information representing each of sizes of maximally selectable permitted areas to be set on a basis of each of the predetermined sets of the coordinate candidates, and wherein the processor performs or supports another device to perform a process of determining the specific permitted area by further referring to the maximal size information.

15. The game server of claim 14, wherein the maximal size information is determined by referring to at least one of (i) information on a distance from the predetermined sets of the coordinate candidates to sea in the game map and (ii) information on a distance from the predetermined sets of the coordinate candidates to one or more preset special terrains in the game map.

16. The game server of claim 10, wherein, at the process of (I), (i) each of one or more game lobbies corresponding to each of the matches is generated, (ii) each of the users selects one of the game lobbies and waits for a certain match, corresponding to said one of the game lobbies, among the matches, and (iii) each of permitted numbers of the players is determined by referring to each of counted numbers of the users corresponding to each of the game lobbies.

17. The game server of claim 16, wherein, before the process of (II), the processor further performs or supports another device to perform:
(II-0) if the specific permitted number is detected as equal to or greater than a group threshold, a process of dividing the specific players into two or more match groups by referring to information on each of experience levels of each of the specific players, and
wherein, at the process of (II), the processor performs or supports another device to perform a process of determining each of the permitted areas corresponding to each of said two or more match groups.

18. The game server of claim 17, wherein, at the process of (II), if each of the specific players is classified into each of said two or more match groups, the processor performs or supports another device to perform (i) a process of selecting each of classified sets of coordinates, to be used for each base point in each of the permitted areas corresponding to each of said two or more match groups, among all the sets of the coordinates within the game map, (ii) a process of determining each of sizes to be used for each of the permitted areas corresponding to each of said two or more match groups by referring to the information on each of the permitted numbers corresponding to each of said two or more match groups, and (iii) a process of determining each of the permitted areas by referring to each of the classified sets of the coordinates and its corresponding each of the sizes of the permitted areas.

* * * * *